United States Patent [19]

Adams et al.

[11] Patent Number: 4,555,294

[45] Date of Patent: Nov. 26, 1985

[54] INORGANIC COMPOSITION ADAPTED FOR USE IN BONDING A HIGH TEMPERATURE RESISTANT POLYMERIC MATERIAL TO AN ALUMINUM BASE SUBSTRATE

[75] Inventors: Kenneth J. Adams, Novelty; David E. Dyke, Shaker Heights, both of Ohio

[73] Assignee: Imperial Clevite Inc., Glenview, Ill.

[21] Appl. No.: 596,319

[22] Filed: Apr. 3, 1984

[51] Int. Cl.$^4$ .............................................. B32B 31/20
[52] U.S. Cl. ............................. 156/309.6; 106/14.44; 106/286.2; 106/302; 156/325; 264/259; 423/61; 423/596; 427/190; 427/201; 428/471; 524/407
[58] Field of Search ........................... 156/309.6, 325; 264/259; 423/61, 596; 524/407; 428/471; 427/190, 201; 106/286.2, 14.44, 302

[56] References Cited

U.S. PATENT DOCUMENTS

| | | |
|---|---|---|
| 2,127,202 | 8/1938 | Boyle .................................. 148/6.2 |
| 2,231,024 | 2/1941 | Pole ....................................... 106/9 |
| 2,271,362 | 1/1942 | Field ..................................... 106/58 |
| 2,294,334 | 8/1942 | Filbert ................................... 148/6 |
| 2,387,528 | 10/1945 | Patterson et al. .................. 106/302 |
| 2,400,271 | 5/1946 | Toff .................................... 423/596 |
| 2,400,272 | 5/1946 | Toff .................................... 423/596 |
| 2,493,934 | 1/1950 | Waring ............................... 148/6.2 |
| 2,562,118 | 7/1951 | Osdal ................................ 148/6.15 |
| 2,838,419 | 6/1958 | Froncis .............................. 106/302 |
| 2,846,342 | 8/1958 | Curtin ............................... 148/6.16 |
| 2,898,250 | 8/1959 | Pimbley ............................ 148/6.21 |
| 3,039,898 | 6/1962 | Keller et al. ...................... 148/6.14 |
| 3,160,509 | 12/1964 | Schaefer et al. ..................... 106/63 |
| 3,403,970 | 10/1968 | Culbertson et al. .............. 423/596 |
| 3,793,055 | 2/1974 | Shodai et al. ........................ 106/74 |
| 3,801,379 | 4/1974 | Blackwell .......................... 427/327 |
| 3,846,170 | 11/1974 | Isawa et al. ......................... 148/6.2 |
| 3,871,894 | 3/1975 | Kubo et al. ........................ 106/302 |
| 4,138,526 | 2/1979 | Borresen ............................ 428/419 |
| 4,189,194 | 2/1980 | Davies ................................. 308/35 |
| 4,193,645 | 3/1980 | Baker et al. .......................... 308/23 |
| 4,361,620 | 11/1982 | Newton ............................. 428/341 |
| 4,421,795 | 12/1983 | Davies ................................ 524/288 |

FOREIGN PATENT DOCUMENTS

| | | | |
|---|---|---|---|
| 2739576 | 5/1978 | Fed. Rep. of Germany ..... 148/6.27 |
| 58-34178 | 2/1983 | Japan .................................... 148/6.2 |

OTHER PUBLICATIONS

"The CaO–MgO–Cr$_2$O$_3$ Ternary System" from the British Refractories Research Association from B.R.R.A. Bulletin, No. 69, Jun. 1945.

*Surface Treatment and Finishing of Aluminum and its Alloys;* Wernick et al.; Robert Draper Ltd.; pp. 163, 164, 168, 169, 182, 183; 1956.

*Metals Handbook;* 8th Edition, vol. 1, "Heat Treating, Cleaning, and Finishing"; Chromate Conversion Coating; p. 547; 1964.

*Primary Examiner*—John J. Gallagher
*Attorney, Agent, or Firm*—Russell E. Baumann

[57] ABSTRACT

An inorganic composition adapted for use in bonding a high temperature resistant polymeric material to an aluminum base substrate is provided. The composition is obtained by reacting a first inorganic compound containing chromium and oxygen with a second inorganic compound containing at least one element selected from the group consisting essentially of calcium, barium and strontium to form a reaction product containing chromium, oxygen and at least one element selected from the group essentially consisting of calcium, barium and strontium. A method of bonding a high temperature resistant polymeric material to an aluminum base substrate using the above composition is also provided.

7 Claims, No Drawings

4,555,294

INORGANIC COMPOSITION ADAPTED FOR USE IN BONDING A HIGH TEMPERATURE RESISTANT POLYMERIC MATERIAL TO AN ALUMINUM BASE SUBSTRATE

BACKGROUND OF THE INVENTION

The present invention relates to the art of coating aluminum and aluminum alloy surfaces with polymeric materials. More particularly, the present invention is directed to a composition used in coating aluminum surfaces with a high temperature resistant polymeric material and/or compounds thereof. In addition, the present invention is directed to a method of coating aluminum surfaces with a high temperature resistant polymeric material.

Aluminum and aluminum alloy materials (herein collectively referred to "aluminum base" materials or substrates) are often used in a hostile environment. That is, articles fabricated from aluminum base materials are often employed in an atmosphere which has a deleterious effect on the the surface of the so-fabricated article. Accordingly, in the past, numerous means have been devised for protecting the aluminum or aluminum alloy surfaces from various types of hostile environments. Such techniques rang from chemically treating the surface of the aluminum base substrate to covering it with a polymeric coating or overlay.

In many instances, it would be desirable to protect the surface of the aluminum base substrate by coating it with an overlay of a special type of polymeric material. However, when one attempts to adherently bond most polymeric materials to an aluminum base substrate, difficulties are often experienced. This is especially true when attempting to bond high temperature resistant polymeric materials to an aluminum base substrate.

Accordingly, a principal object of the present invention is to provide an inorganic composition which can be used to aid in the bonding of a high temperature polymeric material to an aluminum base substrate.

An additional object of the present invention is to provide a method for bonding a high temperature resistant polymeric material to an aluminum base substrate.

These and other objects of the present invention will become apparent from a reading of the following specification and claims.

SUMMARY OF THE INVENTION

In one aspect, the present invention concerns an inorganic composition adapted for use in bonding a high temperature resistant polymeric material to an aluminum base susbstrate which is obtained by reacting a first inorganic compound containing chromium and oxygen with a second inorganic compound containing at least one element selected from the group consisting essentially of calcium, barium and strontium to form a reaction product containing chromium, oxygen and at least one element selected from the group consisting essentially of calcium, barium and strontium.

In still another aspect, the present invention concerns a method for bonding a high temperature resistant polymeric material to an aluminum base substrate comprising providing a reaction product obtained by reacting a first inorganic compound containing chromium and oxygen with a second inorganic compound containing at least one element selected from the group consisting essentially of calcium, barium and strontium to form a reaction product containing chromium, oxygen and at least one element selected from the group essentially consisting of calcium, barium and strontium; bringing the so-obtained reaction product into contact with the surface of the aluminum base substrate which is to be coated with the polymeric material; bringing at least one high temperature polymeric material selected from the group consisting essentially of polysulfone, polyethersulfone, polyamide-imide, polyetheretherketone, polyetherimide, polyphenylene sulfide, polyphenylsulfone, and polymeric compounds containing them into contact with the surface of the substrate which is to be coated; heating the so-applied polymeric material to a temperature sufficient to cause it to flow and cover that portion of the substrate which is to be coated thereby; and cooling the heated coating to a temperature sufficient to cause the high temperature resistant polymeric material to solidify and become adherently bonded to the substrate.

DETAILED DESCRIPTION OF THE PREFERRED EMBODIMENTS OF THE INVENTION

The present invention provides a means of bonding high temperature resistant polymeric materials to an aluminum base substrate. In this regard, the term aluminum base as used herein is intended to include both aluminum and aluminum alloys. Typical of such alloys include ASM Designations 2024, 3003, 5052, 6061 and 7075. The present invention would be equally useful for multilayer material combinations wherein the aluminum base material is the surface material such as aluminum coated steel.

The crux of the present invention is the provision of a composition (reaction product) which serves as an aid in the bonding of the high temperature resistant polymeric materials to an aluminum base substrate.

In this regard, the reaction product is obtained by reacting a first inorganic compound which contains chromium and oxygen with a second inorganic compound which contains at least one element selected from the group consisting essentially of calcium, barium and strontium.

An example of the first inorganic compound which contains chromium and oxygen is chromium sesquioxide ($Cr_2O_3$).

Typical examples of the second inorganic compound are oxides of barium, calcium and strontium such as BaO, CaO and SrO, which are barium oxide, calcium oxide and strontium oxide, respectively. Still other materials are hydroxides and carbonates and bicarbonates of barium, calcium and strontium.

In forming the reaction product, by reacting the first and second compounds, the degree and time of heating varies with the specific elements present. All that is required is that the various materials utilized be heated to a temperature sufficient to cause them to react and form a solid reaction product in the form of a chromite which contains chromium, oxygen and at least one element selected from the group consisting essentially of barium, calcium and strontium.

The so-obtained reaction product is then subjected to a comminuting treatment. The degree of comminution usually is in an amount sufficient to cause the reaction product to be reduced to a micron size powder. In practice, the particle size of the reaction product should be similar to and compatible with that of the high temperature polymer powder with which it is mixed prior to bonding to the substrate.

In the preferred practice of the invention, the comminuted reaction product is mixed with a powdered polymeric high temperature resistant polymeric material. The reaction product is typically between five and twenty-five percent of total mixture although it may be between one and fifty percent. The reaction product and the high temperature resistant polymeric material are intimately mixed together. The so-produced co-mixture is then applied to the surface of the aluminum substrate by any suitable means. Typical examples are by thermal compression molding, injection molding, electrostatic spraying, etc.

In practice the applied co-mixture of reaction product and polymeric material is then heated to a temperature sufficient to cause the polymeric material to flow over the desired surface of the aluminum base substrate. Typically this temperature is between approximately 350° F. and 700° F. Usually, it is desired to utilize a powder resinous material. However, it is possible to use compounded granules and/or sheets of polymeric material mixed with the reaction product.

Ideal results are obtained when the polymeric material is thermally compression molded to the aluminum base substrate. However, it is not essential that this technique be followed. All that is required is that the resinous material be heated to a temperature sufficient to cause it to flow and cover the desired surface of the aluminum base substrate. This can be accomplished by various techniques such as injection molding or coining operations.

The high temperature resistant polymeric material utilized in the practice of the invention is selected from the group consisting of polysulfone, polyethersulfone, polyamide-imide, polyetheretherketone, polyetherimide, polyphenylene sulfide, polyphenylsulfone and polymeric compounds containing them. The foregoing materials are considered high temperature polymers in that they meet the 302° F. UL Temperature Index.

In practice, the polymeric material is applied to the substrate in an amount sufficient to give a coating of the desired thickness. The exact thickness is determined by the specific polymeric material utilized and the environment in which the so-coated article is to be employed. Typically, coating thicknesses range from about 0.001 to about 0.020 of an inch.

The high temperature polymeric material, together with the reaction product, is heated in contact with the aluminum base substrate at a temperature sufficient to cause it to flow and cover the desired portion of the substrate. Typically this temperature is between approximately 350° F. and 700° F. After the polymeric material has been applied to the substrate, the resultant article is then cooled to a temperature sufficient to cause the polymeric material to solidify and become adherently bonded to the substrate.

The invention will now be described with respect to the following examples.

EXAMPLE I

Chromium sesquioxide [chromium oxide (sesqui-)]($Cr_2O_3$) powder was mixed thoroughly with an equimolar amount of calcium oxide (CaO) powder and induction heated in a graphite crucible to a temperature approximately 4712° F. until reaction occurred. The reacted mass was removed from the crucible, crushed and milled to a particle size in the range from 0.5 to 1.5 microns. One part of this powder was mixed thoroughly with nine parts of polyamide-imide powder (Torlon 4000-TF, AMOCO Inc.) and spread onto one surface of a 0.062×1×3-inch sample of aluminum alloy 6061 and thermally compression molded at a pressure of 12,700 psi and a temperature of 650° F. for 20 minutes. The sample was removed from the mold and cooled to room temperature. The aluminum sample was tested and it was observed that the polymeric overlay was adherently bonded to the aluminum base substrate. The same results were achieved when alloy 2024 was substituted for alloy 6061 and the above coating and molding procedures were carried out.

EXAMPLE II

An intimate mixture of chromium sequioxide [chromium oxide (sequi-)]($Cr_2O_3$) powder was mixed thoroughly with an equimolar proportion of calcium oxide (CaO) powder and induction-heated in a graphite crucible to an approximate temperature of 4712° F. until reaction occured. The reacted mass was removed from the crucible and milled to a particle size in the range 0.5 to 1.5 microns. One part of the powder was mixed thoroughly with six parts of polyphenylene sulfide powder (Ryton ®, trademark of Phillips Chemical Company, Inc.) and spread onto the surface of a 0.062×1×3-inch sample of aluminum alloy 5052 and thermally compression molded at a pressure of 3500 psi and a temperature of 550° F. for 10 minutes when a continuous film of polymer was formed. Good bond results were obtained between the polymeric overlay and the aluminum base substrate.

From the foregoing, it is clear that the instant invention provides a means of bonding high temperature resistant polymeric materials selected from the group consisting of polysulfone, polyethersulfone, polyamide-imide, polyetheretherketone, polyetherimide, polyphenylene sulfide, polyphenylsulfone and polymeric compounds containing them to the surface of an aluminum base substrate. Such coated substrates find utility for corrosion protection, composite materials, and insert injection molding, etc.

While there have been described herein what are at present considered to be the preferred embodiments of this invention, it will be apparent to those skilled in the art that various changes and modifications may be made therein without departing from the present invention, and it is, accordingly, intended in the appended claims to cover all such changes and modifications as fall within the true spirit and scope of the instant invention.

What is claimed is:

1. A method of bonding a high temperature resistant polymeric material to an aluminum base substrate is provided which comprises:

providing a reaction product which is obtained by reacting chromium sesquioxide with a second inorganic compound containing at least one element selected from the group consisting essentially of calcium, barium and strontium to form a reaction product chromite $XCr_2O_4$ wherein X is selected from the group essentially consisting of calcium, barium and stronium;

bringing the so-obtained reaction product into contact with the surface of the aluminum base substrate which is to be coated with the polymeric material;

bringing at least one high temperature polymeric material selected from the group consisting essentially of polysulfone, polyethersulfone, polyamide-imide, polyetheretherketone, polyetherimide, polyphenylene sulfide, polyphenylsulfone and polymeric compounds containing them into contact with the surface of the substrate which is to be coated;

heating the so-applied polymeric material and reaction product to a temperature sufficient to cause the polymeric material to flow and cover that portion of the substrate which is to be coated therewith; and cooling the heated cooling to a temperature sufficient to cause the high temperature resistant polymeric material to become adherently bonded to the substrate.

2. The method of claim 1 wherein said second inorganic compound is selected from the group consisting essentially of an oxide, a hydroxide, a carbonate or a bicarbonate of calcium, barium, or strontium.

3. The method of claim 1 wherein said reaction product and polymeric material are in the form of particles and completely mixed together prior to being brought into contact with the aluminum base substrate.

4. The method of claim 3 wherein said particles of said reaction product are generally in the range of from about 0.5 to about 1.5 microns prior to being brought into contact with the aluminum base substrate.

5. The method of claim 4 wherein said particles of said polymeric material have a diameter generally ranging from about 10 to about 20 microns.

6. The method of claim 5 wherein said mixed particles are applied to said substrate by a thermal compression molding procedure.

7. The method of claim 5 wherein said mixed particles are applied to said substrate by injection molding.

* * * * *